(12) United States Patent
Hanson et al.

(10) Patent No.: US 8,490,643 B2
(45) Date of Patent: Jul. 23, 2013

(54) DIVERTER VALVE

(75) Inventors: Dana R. Hanson, St. Charles, IL (US);
Mitchell L. Gritzner, Montgomery, IL (US)

(73) Assignee: Processing Technologies, LLC, Aurora, IL (US)

(*) Notice: Subject to any disclaimer, the term of this patent is extended or adjusted under 35 U.S.C. 154(b) by 484 days.

(21) Appl. No.: 12/890,907

(22) Filed: Sep. 27, 2010

(65) Prior Publication Data

US 2012/0073687 A1    Mar. 29, 2012

(51) Int. Cl.
*F16K 11/07*    (2006.01)
*B29C 31/10*    (2006.01)

(52) U.S. Cl.
USPC ............... 137/240; 137/625.48; 425/130

(58) Field of Classification Search
USPC ........... 137/240, 625.48; 264/241; 425/130, 425/562
See application file for complete search history.

(56) References Cited

U.S. PATENT DOCUMENTS

| | | | |
|---|---|---|---|
| 3,886,963 A * | 6/1975 | Jones et al. | 425/562 |
| 4,164,956 A * | 8/1979 | Takahashi et al. | 425/562 |
| 4,931,246 A * | 6/1990 | Kudert et al. | 264/241 |
| 5,076,777 A * | 12/1991 | Schmitt | 425/133.5 |
| 5,110,276 A * | 5/1992 | Farnsworth et al. | 425/133.1 |
| 5,616,350 A * | 4/1997 | Wissmann et al. | 425/133.1 |
| 5,711,349 A * | 1/1998 | Wissmann | 137/876 |
| 5,858,420 A * | 1/1999 | Szajak et al. | 425/557 |
| 6,174,478 B1 * | 1/2001 | Silver | 425/133.1 |
| 2004/0159964 A1 * | 8/2004 | Lavoie et al. | 264/40.1 |
| 2004/0213983 A1 * | 10/2004 | Nodono et al. | 428/304.4 |

* cited by examiner

*Primary Examiner* — John Rivell
(74) *Attorney, Agent, or Firm* — Wood, Phillips, Katz, Clark & Mortimer (57) ABSTRACT

A diverter valve controlling input of two different extruded materials has a valve body having an axially extending opening, and a valve piston axially movable in the opening between first and second positions. The body defines a first inlet for receiving a first material, and a second inlet for receiving a second material with first and second outlets opposite the inlets. The piston has first and second through channels and first and second cross-over channels, each with inlet side and outlet side ports. A first flushing channel communicates with the first inlet and end ports, a second flushing channel communicates with the second inlet and end ports, and a third flushing channel opposite the first two communicates with the second outlet and includes a plurality of ports, with all the ports, inlets and outlets open to the axial opening.

13 Claims, 6 Drawing Sheets

Fig. 1

DIVERTER VALVE

CROSS REFERENCE TO RELATED APPLICATION(S)

Not applicable.

STATEMENT REGARDING BACKGROUND OF THE INVENTION AND TECHNICAL PROBLEMS POSED BY THE PRIOR ART

Molding of extruded materials to form countless products is widely done. As is well known, an extruder is used to provide the extruded material to a suitable die in which the extruded material is shaped to create the desired object. Commonly, the object which is created has a uniform continuous shape, such as conduits, pipes and flat sheets.

Extruded sheets, for example, may be formed from many different materials, with many different thicknesses, and with different layer constructions. An extruded sheet may be formed by itself or combined with one or more other sheet layers that are concurrently formed, or combined after formation. In a typical apparatus for extrusion forming of sheet products, a roll stand is placed downstream of an extruder assembly with an associated sheet die. Flowable material is delivered from one or more extruders through the sheet die to a nip/lamination location between adjacent rolls on the roll stand.

Apparatuses for forming an extruded sheet products are shown, for example, in my U.S. Ser. No. 12/455,353, entitled "Height Positioning Mechanism for Roll Stand Assembly on an Apparatus for Continuously Forming an Extruded Sheet Product", filed Jun. 1, 2009; U.S. Ser. No. 12/455,344, entitled "Linear Bearing Assembly to Guide Movement of Roll Stand on Apparatus for Forming an Extruded Sheet Product", filed Jun. 1, 2009; U.S. Ser. No. 12/455,376, entitled "Gap Adjusting Mechanism for Rolls on a Roll Stand Used in the Extrusion Forming of a Sheet Product", filed Jun. 1, 2009; and U.S. Published Patent Application No. US-2010-0038037-A1, entitled "Apparatus for Applying a Film to a Bottom Side of an Extruded Sheet", published Feb. 18, 2010. The disclosures of all of these patent applications is hereby fully incorporated by reference.

Moreover, various products, including sheet products, can require the use of two separate materials, such as shown, for example, in U.S. Publ. Application No. US-2008-0314525-A1, entitled "Web Lamination System", published Dec. 25, 2008, the disclosure of which is hereby fully incorporated by reference. Molding of such products requires the supply of material from at least a first extruder assembly and a second extruder assembly, with a first material provided by one and a second material provided by the other. It should be appreciated that use two different materials may from time to time be switched. For example, when the two materials differ in color, or in texture, it may be desirable to form a product (e.g., a sheet material) having one color or texture on its outer skin, and also to form a similar product but with the other color or texture on its outer skin. This may be accomplished by swapping the connection between the outputs of the extruder assemblies to the inputs of the mold.

It should be appreciated, however, that swapping connections can result in bleed over and mixing of materials in the lines between the extruder assemblies and the mold. If, for example, one of the materials is hidden on the interior of a sheet, covered by the other material on the skin of the sheet, such mixing of materials in the unseen interior of the sheet may not be a major concern. However, similar mixing of the material which is molded to form the skin of the sheet can cause the sheet to have a different visible color than desired, either through some mixing of the colors or a speckling of one color with the other. Such an appearance is not only not what is desired, but it can give the appearance that the sheet was poorly manufactured, and possibly make the sheet unacceptable to a buyer.

The present invention is directed toward overcoming one or more of the problems set forth above.

SUMMARY OF THE INVENTION

The present invention provides a novel, improved valve for diverting between two different extruded materials to swap the material sent to different parts of a mold block, where the purity of the material sent to one part of the mold block is critical to the manufacture of the molded material. This is accomplished with a compact structure which may be easily and reliably operated and controlled with minimal addition of parts.

In one aspect of the present invention, a diverter valve is provided for controlling input of two different extruded materials to a mold for molding one of the materials covering the other of the materials. The diverter valve includes a valve body having an axially extending opening therethrough, and a valve piston selectively axially movable in the body opening between a first position and a second position. The valve body defines (a) a first inlet in one side adapted to received a first extruded material, and a second inlet in the one side adapted to receive a second extruded material, (b) a first outlet in the side opposite of the one side, and a second outlet in the opposite side, (c) a first flushing channel communicating with the first inlet and including end ports open to the axial opening, (d) a second flushing channel communicating with the second inlet and including end ports opening to the axial opening, and (e) a third flushing channel communicating with the second outlet and including a plurality of ports opening to the axial opening. The piston defines first and second through channels extending between the one side and the opposite side, a first cross-over channel having an inlet side port and an outlet side port, and a second cross-over channel having an inlet side port and an outlet side port. In the first piston position, (i) the first through channel connects the first inlet with the first outlet and the second through channel connects the second inlet with the second outlet, (ii) the valve piston blocks the end ports of the first flushing channel, and (iii) the first and second cross-over channels connect the second and third flushing channels to allow flow of material therein from the second inlet. In the second piston position, (i) the first cross-over channel connects the first inlet with the second outlet and the second cross-over channel connects the second inlet with the first outlet, (ii) the valve piston blocks the end ports of the first flushing channel, and (iii) the first and second through channels connect the first and third flushing channels to allow flow of material therein from the first inlet.

In one form of this aspect of the invention, flow of material from the flushing channels to the first outlet is blocked in both the first and second positions of the valve piston.

In another form of this aspect of the present invention, the first and second inlets are axially spaced a distance X, and the first and second outlets are axially spaced the distance X, the first and second through channels are axially spaced the distance X, the inlet side port of the first cross-over channel and the inlet side port of the second cross-over channel are axially spaced the distance X, and the outlet side port of the first cross-over channel and the outlet side port of the second cross-over channel are axially spaced the distance X. In a further form, the second cross-over channel inlet side port is axially aligned with the first cross-over channel outlet side port and the second cross-over channel outlet side port is axially aligned with the first cross-over channel inlet side port.

In yet another form of this aspect of the present invention, the first and second through channels have an axially extending width W, as do the first and second cross-over channel ports, with the axially adjacent ports being spaced at their nearest points a distance S, wherein S<W. In a further form, the first and second through channels are substantially cylindrical with a diameter W.

In still another form, the first outlet provides material to a die for covering material provided by the second outlet.

In another aspect of the present invention, a diverter valve is provided for controlling input of two different extruded materials to a mold for molding one of the materials covering the other of the materials. The valve includes a valve body having an axially extending opening therethrough and a valve piston selectively axially movable in the body opening between a first position and a second position. The valve body defines (a) a first inlet in one side adapted to received a first extruded material, and a second inlet in the one side adapted to receive a second extruded material, the first and second inlets being axially spaced a distance X, (b) a first outlet in the side opposite of the one side, and a second outlet in the opposite side, the first and second outlets being axially spaced the distance X and axially aligned with the first and second inlets, respectively, (c) a first flushing channel communicating with the first inlet and including a first pair of ports at opposite ends open to the axial opening, (d) a second flushing channel communicating with the second inlet and including a second pair of ports at opposite ends opening to the axial opening, and (e) a third flushing channel communicating with the second outlet and including a third pair of ports at opposite ends opening to the axial opening and first and second intermediate ports opening to the axial opening wherein the third pair of ports and first and second intermediate ports are axially aligned with the first and second outlets. The valve piston defines: (i) first and second through channels extending between the one side and the opposite side, the through channels being spaced apart axially by the distance X, (ii) a first cross-over channel having an inlet side port and an outlet side port, the inlet side port being axially spaced from the outlet side port by the distance X, and (iii) a second cross-over channel having an inlet side port and an outlet side port, the second cross-over channel inlet side port being axially aligned with the first cross-over channel outlet side port and the second cross-over channel outlet side port being axially aligned with the first cross-over channel inlet side port. In the first valve piston position, the first through channel connects the first inlet with the first outlet and the second through channel connects the second inlet with the second outlet, the first cross-over channel connects one of the second pair of ports with one of the third pair of ports, the second cross-over channel connects the other of the second pair of ports with the first intermediate port, and the first pair of ports, the other of the third pair of ports, and the second intermediate port are blocked by the piston. In the second piston position, the first through channel connects one of the first pair of ports with one of the third pair of ports, the second through channel connects the other of the first pair of ports with the second intermediate port, the first cross-over channel connects the first inlet with the second outlet, the second cross-over channel connects the second inlet with the first outlet, the other of the third pair of ports and the first intermediate port are blocked by the piston, and the second pair of ports, the one of the third pair of ports, and the first intermediate port are blocked by the piston.

In yet another form of this aspect of the present invention, the first and second through channels have an axially extending width W, as do the first and second cross-over channel ports, with the axially adjacent ports being spaced at their nearest points a distance S, wherein S<W. In a further form, the first and second through channels are substantially cylindrical with a diameter W.

In one form of this aspect of the present invention, the third flushing channel intermediate ports are between the first and second outlet, which are between the third pair of ports, the outlets and the third flushing channel ports being oriented in an axially extending row and spaced from adjacent ports and outlets by a distance of X/3.

In a further or separate form of this aspect of the present invention, the first inlet is between the first pair of ports, the second inlet is between the second pair of ports, one port of the first pair of ports is between the second inlet and one port of the second pair of ports, and the one port of the second pair of ports is between the first inlet and the one port of the first pair of ports, wherein the inlets and the first and second pair of ports are oriented in an axially extending row and spaced from adjacent ports and inlets by a distance of X/3.

DETAILED DESCRIPTION OF THE INVENTION

While this invention is susceptible of embodiment in many different forms, this specification and the accompanying drawings disclose only one specific form as an example of the use of the invention. The invention is not intended to be limited to the embodiment so described, and the scope of the invention will be pointed out in the appended claims.

For ease of description, the apparatus operating in accordance with this invention is described in the normal (upright) operating position, and terms such as upper, lower, horizontal, etc., are used with reference to this position.

The apparatus of this invention can have certain conventional components and control mechanisms the details of which, although not fully illustrated or described, will be apparent to those having skill in the art and an understanding of the necessary functions of such components and mechanisms.

Some of the Figures illustrating the preferred embodiment of the apparatus of the present invention show conventional structural details and mechanical elements or components that will be recognized by one skilled in the art. However, the detailed descriptions of such elements are not necessary to an understanding of the invention, and accordingly, are herein presented only to the degree necessary to facilitate an understanding of the novel features of the present invention.

Figure 1:
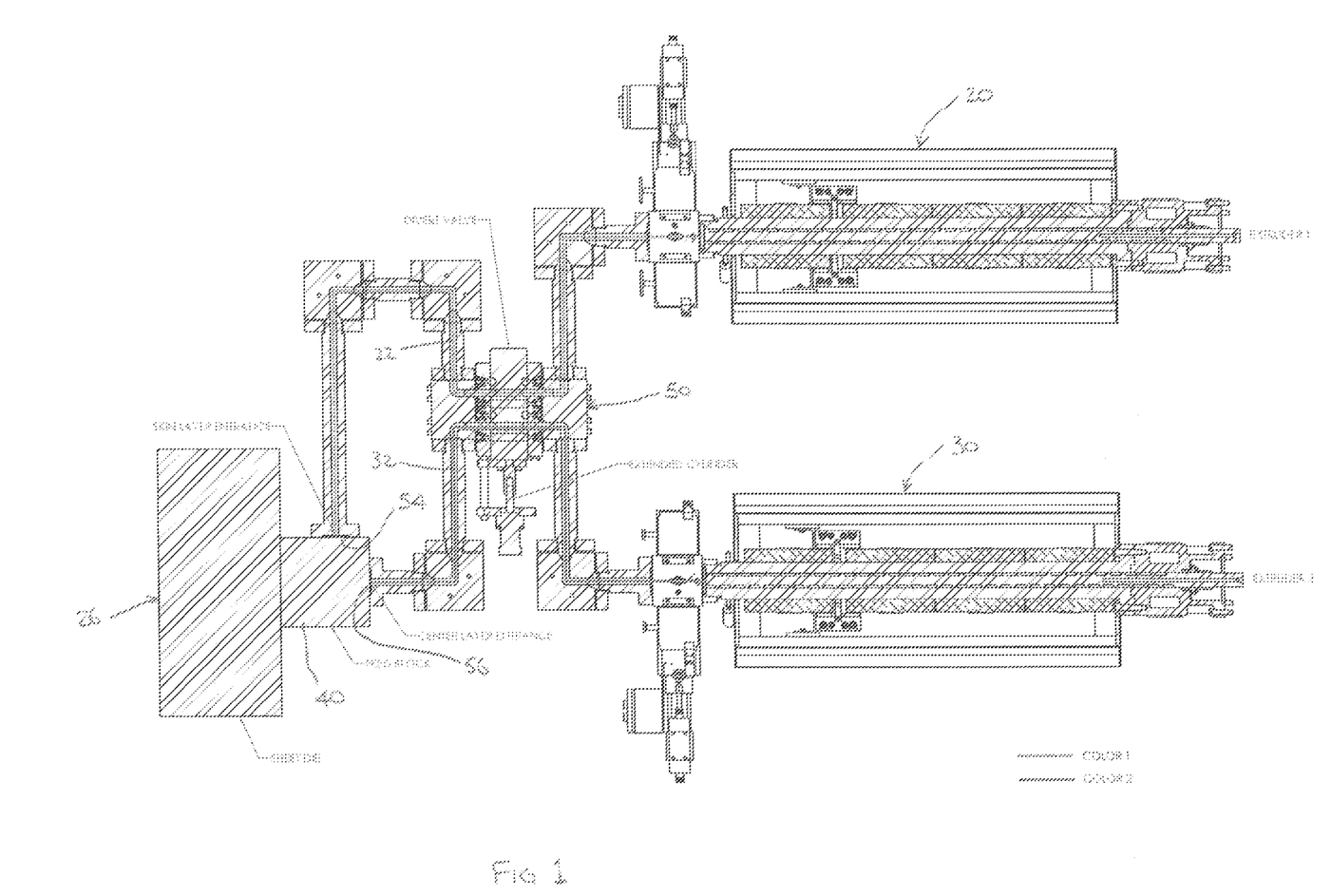
FIG. 1 is cross-sectional schematic view of a molding system in a first configuration.
Figure 2:
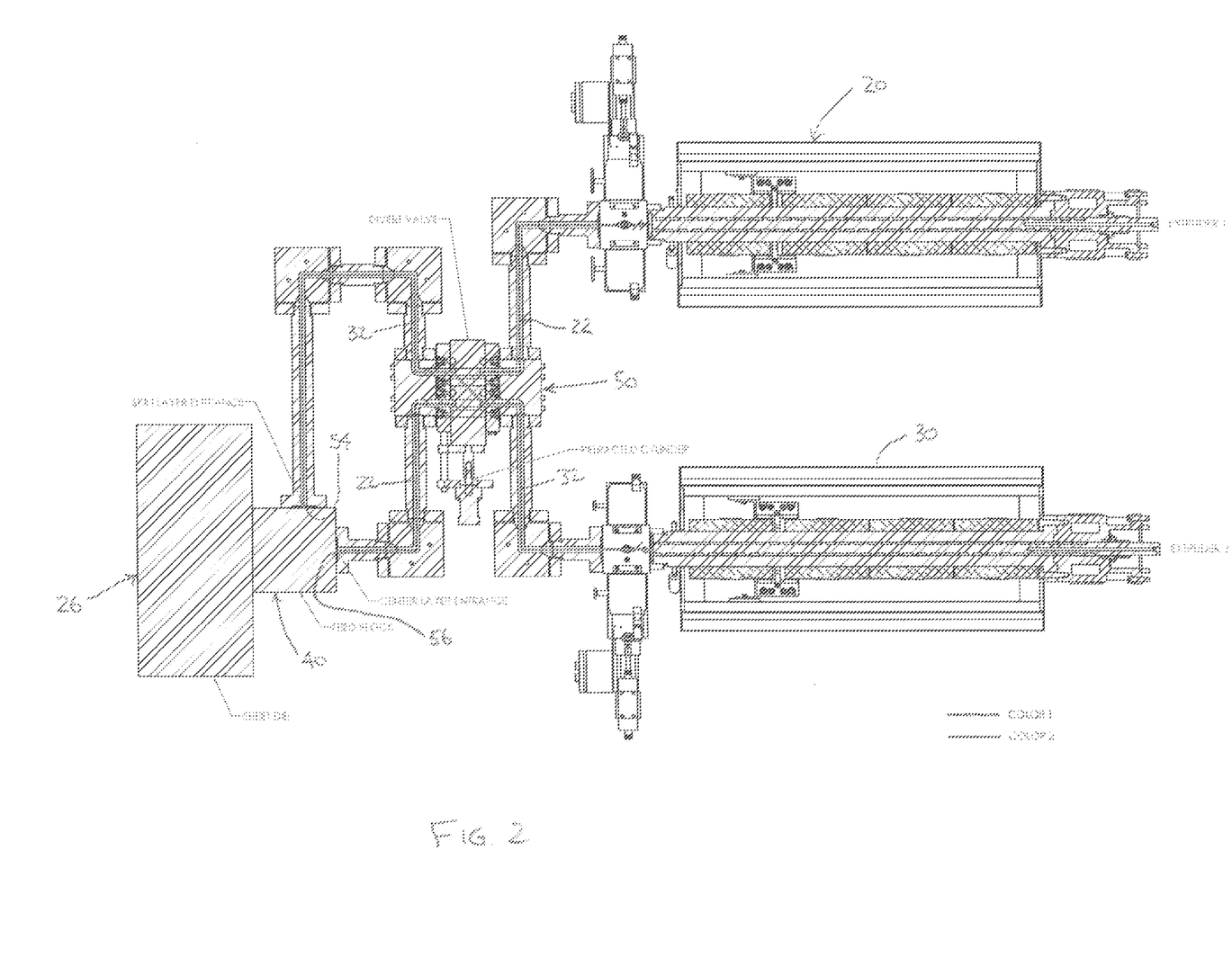
FIG. 2 is a cross-sectional schematic view of the molding system of FIG. 1 in a second configuration with the supply of the two materials to the mold swapped from the first configuration.

FIGS. 1-2 illustrate a molding system in which a first extruder 20 supplies a first extruded material 22 to a suitable die or mold 26, and a second extruder 30 supplies a second extruded material 32 to the die 26.

In accordance with the present invention, the die 26 may advantageously be of a type used to mold objects having an internal material which is hidden by a covering material over the internal material (note that "objects" is intended to refer not only to discrete, separate items, but also, e.g., continuously molded components which may desirably have different characteristics at different portions of the continuous component). As illustrated in FIG. 1, the die 26 may include a feed block 40, with a first entrance or inlet port 54 connected to the cavity in the die 26 defining the covering portion of the object to be molded, and a second entrance or inlet port 56 connected to mold cavity in the die 26 defining the internal portion of the object.

As will be appreciated with a full understanding of the present invention as further described herein, the details of the die 26 and feed block 40 are important only insofar as they facilitate molding of two materials, where one material covers the other, and any die and/or feed block 40 suitable for such molding would be suitable for use with the present invention.

More particularly, the present invention relates to a diverter valve 50 which may be advantageously used to switch the feed paths of the two extruders 20, 30 so that molded objects may be formed with either of the two materials as the internal material and the other of the two materials as the covering material. Such operation is applicable, for example, to co-extrusion of polymers with colors and/or different blends of polymers where a surface or visual effect is desired (i.e., different color or exterior appearance or feel). Examples include co-extruded sheet where the exterior color is different that the interior and frequent color changes are desired. Switching materials between alternate molding configurations may be advantageously accomplished in a manner which ensures that the switch over is accomplished without spoiling the new covering material (which had been the internal material) with undesirable remnants of the new internal material (which had been the covering material). Thus, as will become apparent from the disclosure herein, frequent color changes may be made on a continuous basis without shutting the in-feeding extruders down for clean out. Further, as will also become apparent, the diverter valve 50 of the present invention will permit continuous flushing of the off-line extruder to occur such that a quick change over can take place at the desired time.

As will be described in greater detail below, the diverter valve 50 in a "straight-through", or extended cylinder, position will direct the first material 22 (e.g., having a first color) provided by the first extruder 20 to the first entrance or inlet port 54 to the die feed block 40, with the second material 32 (having, e.g., a second color different from the first color) provided by the second extruder 30 and directed to a second entrance or inlet port 56 to the die feed block 40. Where the first inlet port 54 supplies extruded material to the skin layer or covering material portion of the die 26, and the second inlet port 56 supplies extruded material to the center layer or internal material portion of the die 26, it will be appreciated that in the FIG. 1 configuration of the diverter valve 50, the molded object will, for example, have an appearance featuring the first color.

Alternatively, the diverter valve 50 in the "cross-over" or "retracted cylinder", position of FIG. 2 (as will be described in greater detail below) will direct the first material 22 (e.g., having a first color) provided by the first extruder 20 to the second entrance or inlet port 56 to the die feed block 40, with the second material 32 provided by the second extruder 30 and directed to the first entrance or inlet port 54 to the die feed block 40. It should be appreciated that in this alternate, FIG. 2 configuration of the diverter valve 50, the molded object will have the second material 32 as its covering material whereby, for example, the molded object would have an appearance featuring the second color (i.e., the color of the second material 32).

Though not shown in the drawings, it should be appreciated that feed to the second inlet port 56 (for the center, interior portion of the molded object) may, in addition to the extruder not being used for the skin layer, also be provided via a third extruder (e.g., when the volume of material on the interior is greater than the volume of material required for the surface of the molded object).

Figure 3:
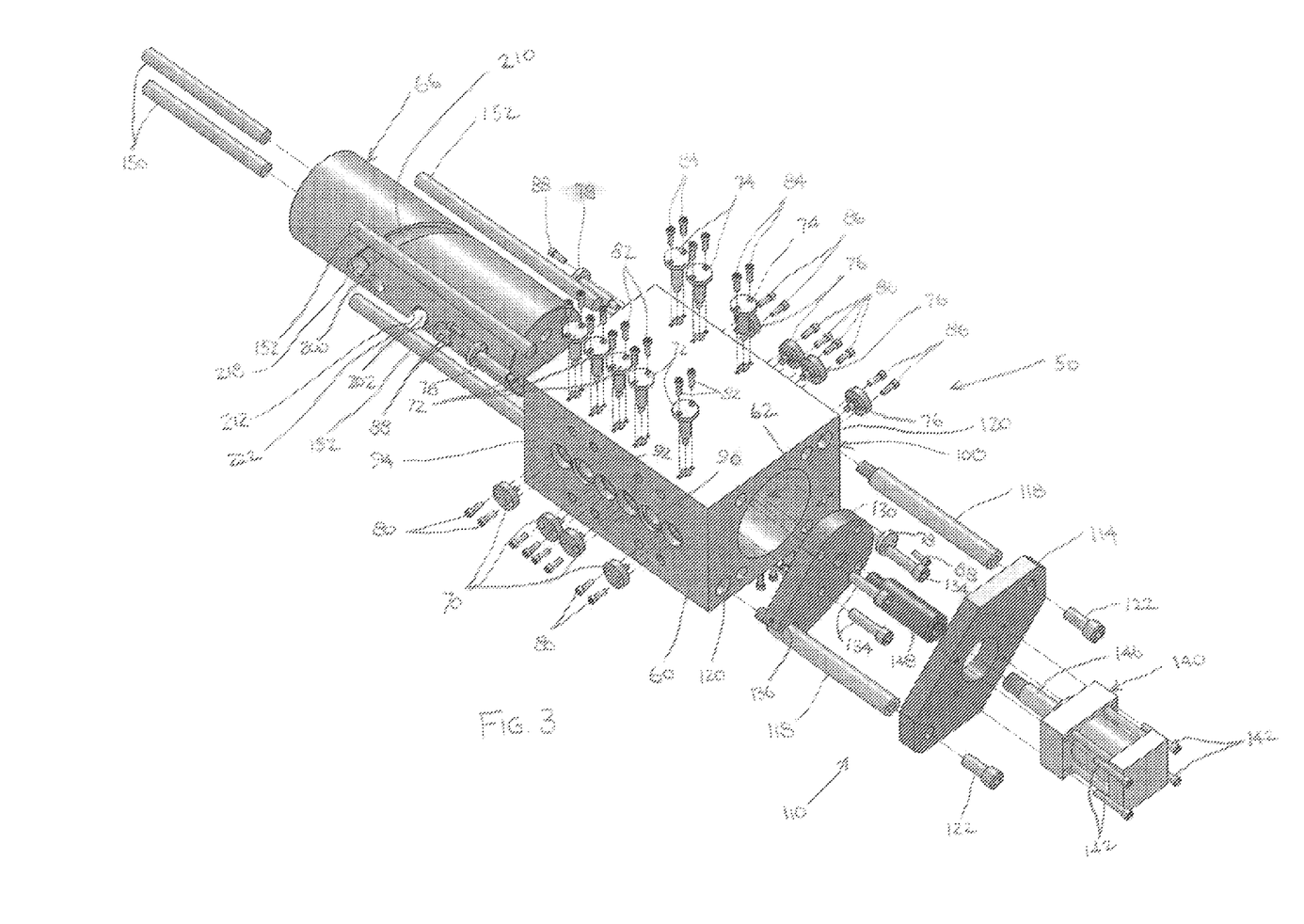
FIG. 3 is an exploded perspective view of a diverter valve according to the present invention which the operates to control the configuration of the molding system.

An advantageous diverter valve 50 according to the present invention is illustrated in exploded form in FIG. 3. The valve 50 includes a valve body 60 having an axial opening 62 therethrough. A valve piston 66 is located in the axial opening 62 for slidable axial motion relative to one another as described in further detail hereafter. It should be appreciate that while the central opening 62 and valve piston 66 are not required to be cylindrical in shape, a generally cylindrical shape may nonetheless be advantageously used, with close tolerances between the two desirable, as will become apparent with a full understanding of the present invention.

The valve body 60 and valve piston 66 may advantageously be made from materials which may suitably be polished and hardened to prevent scoring or gulling from occurring during normal operation, and further so that a suitable small tolerance between the outer diameter of the valve piston 66 and inner diameter of the valve body 60 may be accomplished to prevent leaking of polymer from occurring. Such tolerances also serve to prevent cross flow from occurring between adjacent flow-channels that are characteristic in the valve piston 66 as described further below.

As described in greater detail hereafter, the valve body 60 includes a plurality of channels defined therein. In the illustrated embodiment, a plurality of port plugs 70, 72, 74, 76, 78 and associated securing screws 80, 82, 84, 86, 88 are provided to close openings in the valve body 60 which are not required during operation but which may be created to allow access for machining of the valve body channels, which may require drilling from outside the valve body 60. The port plugs 70-78 may advantageously be machined on the end to provide smooth flow surfaces at the channels. Further, the port plugs 70-76 and associated securing screws 80-86 (particularly the plugs 70, 76 and screws 80, 86 on the entrance and exit sides of the valve body 60) may be recessed into the valve body 60 to avoid interference, for example with adapters which may be required to be bolted to the surface of the body 60 during installation.

Figure 4:
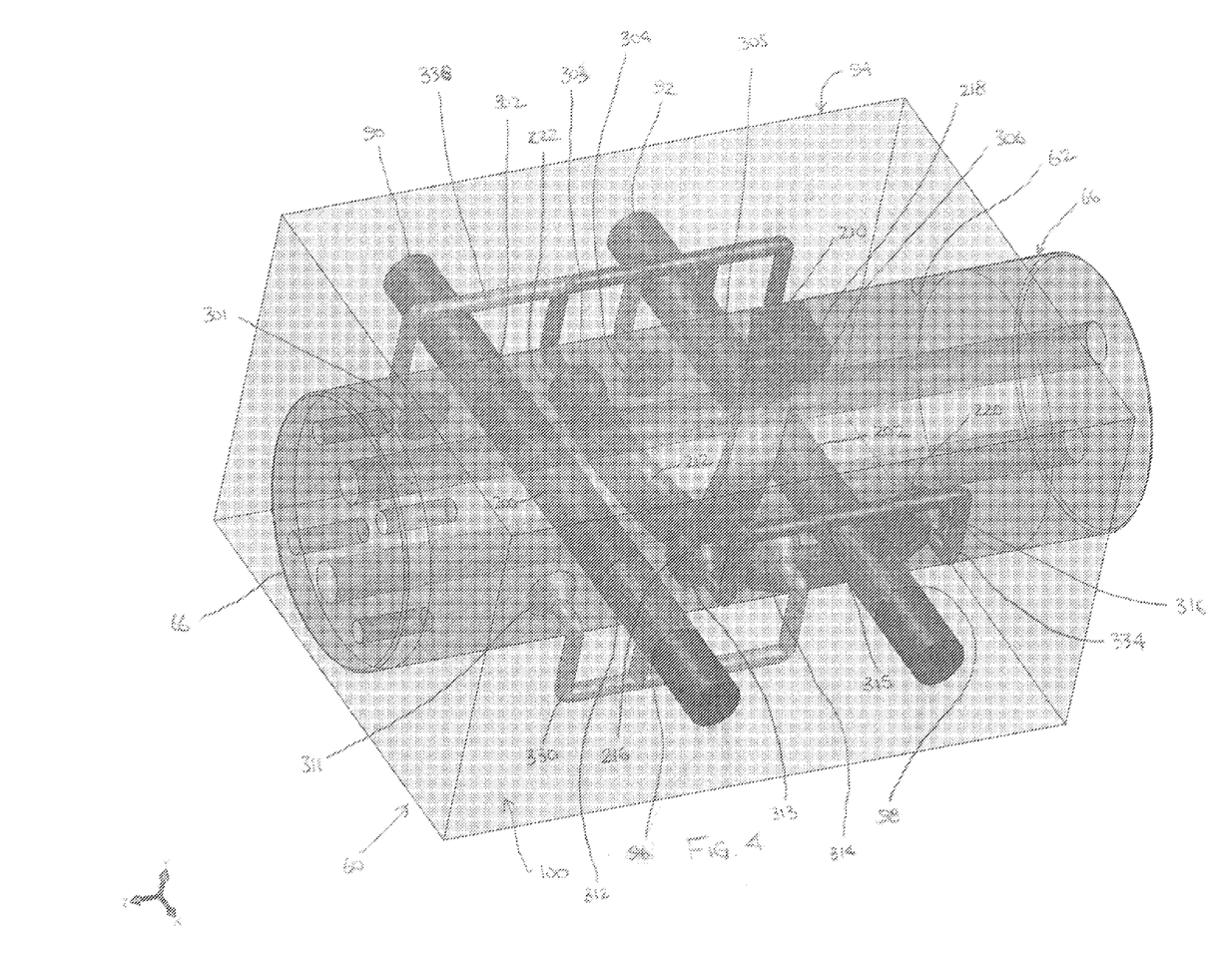
FIG. 4 is a perspective partial view of the FIG. 3 diverter valve in the position placing the molding system in the first (straight through) configuration, wherein components are shown semi-transparently to illustrate interior passages in the diverter valve.
Figure 5:
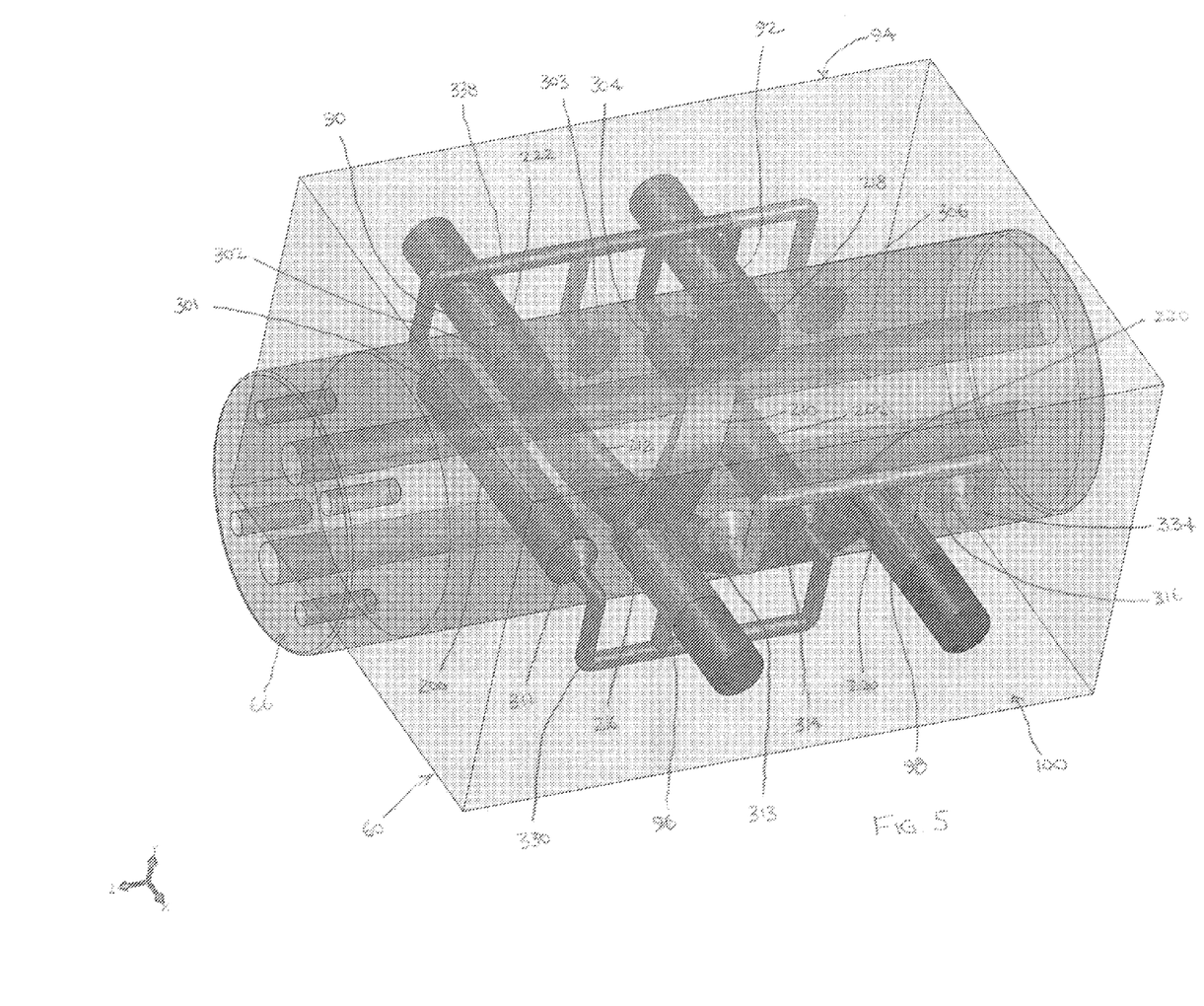
FIG. 5 is a view like FIG. 4, showing the diverter valve in the position placing the molding system in the second (cross-over) configuration.

The valve body 60 also includes two outlets 90, 92 on the exit side 94 of the body 60 (see FIG. 3) and two inlets 96, 98 on the entrance side 100 of the body 60 (note that the entrance side 100 may be best seen in FIGS. 4-5.) The outlets 90, 92 and inlets 96, 98 extend through the body 60 to its central opening 62, with the first outlet 90 axially aligned with the first inlet 96 and the second outlet 92 axially aligned with the second inlet 98. Further, the outlets 90, 92 have a predetermined, known axial spacing X between each other, and the inlets 96, 98 are similarly axially spaced by the known distance X.

A mounting bracket 110 is secured to one end of the valve body 60 and to the valve piston 66 for controlling the axial position of the piston 66 in the valve body 60 while reliably preventing rotation of the piston 66 relative to the body 60.

The bracket 110 includes a cylinder mounting plate 114 suitably secured in a spaced relationship from the end of the body 60 by cylinder extensions 118. As illustrated, the cylinder extensions 118 are screwed into threaded openings 120 at the end of the valve body 60, with the mounting plate 114 secured to the other end of the extensions 118 by, for example, bolts 122.

An anti-rotation bracket 130 is suitably secured to one end of the valve piston 66 (e.g., by suitable bolts or pins 134). The anti-rotation bracket 130 is also slidably connected to one of the cylinder extensions 118, for example, via a semi-cylindrical recess 136 in which the one cylinder extension 118 is received.

A suitable hydraulic cylinder 140 is secured to the mounting plate 114 (e.g., by suitable bolts 142). The cylinder rod 146 of the hydraulic cylinder 140 is suitably secured to the anti-rotation bracket 130 (e.g., by a cylinder rod extension 148).

It should thus be appreciated that the hydraulic cylinder 140 can be actuated to move the anti-rotation bracket 130 and connected valve piston 66 axially relative to the valve body 60 while at the same time ensuring that the valve piston is not rotated relative to the valve body 60.

Cartridge heaters 150 may advantageously be provided along the length of the valve body 60, and cartridge heaters 152 may also be provided along the length of the valve piston 66 (e.g., within axial bores in the body 60 and piston 66) to ensure that the valve 50 be at suitable temperature for passing the extruded materials therethrough. The heaters 150, 152 may, for example, be electric cartridge style heaters, and may be controlled to control temperatures in separate zones to assure precise temperature is maintained. It should also be noted that the mounting bracket 110, and the cylinder rod extension 148, enable the hydraulic cylinder 140 to control the position of the piston 66 relative to the body 60 while at the same time maintaining a distance which prevents the hydraulic cylinder 140 from being overheated by the heat from the cartridge heaters 150, 152.

The valve piston 66 includes a number of channels for passage of extruded material depending on the condition of the diverter valve 50 (i.e., the position of the valve piston 66) as described in detail below.

Specifically, the piston 66 includes first and second through channels 200, 202 which each extend along a radius of the piston 66 from one side to the other. The channels 200, 202 are axially spaced apart by a distance X substantially equal to the axial spacing of the two outlets 90, 92 (and the two inlets 96, 98) of the valve body 60.

Additionally, first and second bypass or cross-over channels 210, 212 are provided in the outer surface of the piston 66. These cross-over channels 210, 212 essentially cross-over from one side to the other, so that the first cross-over channel 210 has an inlet port 216 on one end which is axially spaced from its outlet port 218 on the other end by the distance X (i.e., substantially equal to the axial spacing of the two valve body outlets 90, 92 and the axial spacing of the two valve body inlets 96, 98). The second cross-over channel 212 extends axially in the opposite direction of the first, but similarly has an inlet port 220 on one end which is axially spaced from its outlet port 222 on the other end by the distance X. Moreover, the inlet port 216 of the first cross-over channel 210 is axially aligned with the outlet port 222 of the second cross-over channel 212, and the outlet port 218 of the first cross-over channel 210 is axially aligned with the inlet port 220 of the second cross-over channel 212.

The valve body 60 includes a plurality of flow channels for the extruded material as best shown in the simplified, semi-transparent view of FIGS. 4-5.

More specifically, the outer (exit and entrance) sides 94, 100 of the valve body 60 each include two openings allowing passage of extruded material into (via inlets 96, 98 on entrance side 100) and out of (via outlets 90, 92 on exit side 94) the valve body 60.

Moreover, on each of the inner sides of the valve body 60 there are six axially spaced ports (ports 301, 302, 303, 304, 305, 306 adjacent the exit side 94 of the body central opening 62, and ports 311, 312, 313, 314, 315, 316 adjacent the entrance side 100 of the body central opening 62) which are open into the body central opening 62, with each of the six being radially aligned with one of the ports on the opposite inner side.

Advantageously, the ports on each side may be evenly spaced in an axial direction, with adjacent ports spaced center-to-center by a distance substantially equal to one third the axial spacing X of the outlets 90, 92 and inlets 96, 98 (i.e., X/3). As described in greater detail hereafter, the ports 301-306 and 311-316 will, depending on the position of the valve piston 66, be either blocked shut by the valve piston 66 or in communication with one of the through channels 200, 202 or cross-over channels 210, 212 of the valve piston 66.

In the valve body 60 on opposite sides of the body central opening 62 are a plurality of flushing channels. Specifically:

i) A first flushing channel 330 communicates with the inlet 96 as well as to ports 311, 312 and 314. Ports 311 and 314 are at the end of the channel 330, with port 312 aligned with inlet 96 between ports 311 and 314.

ii) A second flushing channel 334 communicates with the inlet 98 and ports 313, 315 and 316. Ports 313 and 316 are at the end of the channel 334, with port 315 aligned with inlet 98 between ports 313 and 316.

iii) A third flushing channel 338 (on the exit side 94) communicates with the second outlet 92 and ports 301 and 303-306. Ports 302 and 305 are aligned with outlets 90, 92 respectively, with ports 301 and 306 being end ports and ports 303 and 304 being intermediate ports positioned between the outlets 90, 92.

Because the straight-through channels 200, 202 and the cross-over channels 210, 212 are intended to carry more material flow volume than the flushing channels, 330, 334, 338, those channels 200, 202, 210, 212 are larger in diameter or cross-sectional area than the flushing channels 330, 334, 338. As a result, the ports which are connected to one of the flushing channels 330, 334, 338 and open to the axial opening 62 in the body 60 (i.e., ports 301, 303, 304, 306, 311, 313, 314, 316) are preferably tapered outwardly, or bell shaped, to provide an opening size which will match the size of the straight-through channels 200, 202 and the inlet and outlet ports 216, 218, 220, 222 of the cross-over channels 210, 212. This configuration thus avoids transverse surfaces which might otherwise undesirably project into the flow path during either of the normal operating positions.

The flushing channels 330, 334, 338 provide continuously cleaning of the unused flow passages in the valve piston 66, which is particularly useful for quick color change-over. Additionally, the valve 50 may serve as a structural element permitting high pressure adapters to interconnect the in-feeding extruders 20, 30, where the extruder 20 or 30 that is not online is can be flushed continuously into a region of the end product that is not esthetic or visible while the other extruder 30 or 20 is feeding the color or primary exiting port of the flow network.

As previously noted, this valve 50 may be advantageously used to mold a piece having, for example, an internal material covered by a different covering material, where the piece can alternately be made of two colors. That is, by providing a first extruded material of one color and a second extruded material having a second, different, color, the color of the molded object can be changed by changing which material is fed to the internal cavity forming the internal portion of the piece and which material is fed to the covering cavity forming the covering portion of the piece.

Specifically, in the configuration illustrated in FIGS. 1 and 4, the valve piston 66 is in an extended position (i.e., the cylinder rod 146 is extended from the hydraulic cylinder 140), wherein the through channel 200 connects inlet 96 with outlet 90, and through channel 202 connects inlet 98 with outlet 92. Thus, as schematically illustrated in FIG. 1, material from the first extruder 20 will be supplied to inlet 96, and then through port 312 into through channel 200, out port 302 and out outlet 90 to the die inlet port 54 from which the material is used to form the surface portion or skin of the molded object. Material from the second extruder 30 will be supplied to inlet 98, and then through port 315 into through channel 202, out port 305 and out outlet 92 to the die inlet port 56 where that material is used to form the interior or center layer portion of the molded object.

When it is desired to switch the use of the different extruded materials, the cylinder rod 146 is retracted to the retracted (or cross-over) position shown in FIGS. 2 and 5.

In the retracted position, the first cross-over channel 210 has its inlet port 216 communicating with inlet 96 and its outlet port 218 communicating with outlet 92, and the second cross-over channel 212 has its inlet port 220 communicating with inlet 98 and its outlet port 222 communicating with outlet 90. Thus, material from the first extruder 20 will be supplied from the inlet 96 and then, via the first cross-over channel 210, to the second outlet 92 and on to the die inlet port 56, and material from the second extruder 30 will be supplied from the inlet 98 and then, via the second cross-over channel 212, to the first outlet 90 and on to the die inlet port 54. In the example used herein, the different material (e.g., having a different color) from the second extruder 30 is thus supplied to form the surface of the molded object and the material from the first extruder 20 is then supplied to form the interior portion of the molded object.

Moreover, it should be appreciated that no matter which valve piston channels (200, 202, or 210, 212) are used in a particular configuration, the other channels (210, 212 or 200, 202) will be flooded with material to facilitate proper continuing operation whenever the configuration of the diverter valve 50 is changed. That is:

a. When the valve piston 66 is in the extended position (FIG. 4) in which the through ports 200, 202 are used to carry material to the die inlet ports 54, 56, respectively (i.e., with material from the first extruder 20 carried via inlet 96 through port 200 to die inlet port 54 to form the object surface, and material from the second extruder 30 carried via inlet 98 through port 202 to die inlet port 56 to form the center layer portion):
  i. The cross-over channels 210, 212, though not carrying material to the die 26, are nonetheless advantageously kept flooded with extruded material from the second extruder 30 (i.e., the material used to form the center layer portion). Such flooding occurs via material flow from the second extruder 30 via inlet 98 and then in the second and third flushing channels 334, 338 (through ports 303, 313, 306, 316).
  ii. Flow of the material from the second extruder 30 in those flushing channels 334, 338 is isolated from the material from the first extruder 20. That is, in addition to flow of the material from the first extruder 20 through channel 200, flow of that material is connected only to the first flushing channel 330 (which dead heads at ports 311 and 314 against the side of the valve piston 66). Accordingly, the interior material (from the second extruder 30 entering inlet 98) will not undesirably pollute the intended flow of the surface material (which flows straight through via channel 200), and therefore will not risk giving the surface material an undesired color and/or texture or mixtures thereof.
b. When the valve piston 66 is in the retracted position (FIG. 5) in which the cross-over ports 210, 212 are used to carry material to the die inlet ports 56, 54 (i.e., with material from the first extruder 20 carried via inlet 96 through cross-over port 210 to die inlet port 56 to form the object center layer portion, and material from the second extruder 30 carried via inlet 98 through cross-over port 212 to die inlet port 54 to form the object surface):
  i. The through channels 200, 202 are similarly advantageously kept flooded with extruded material from the first extruder 20 (which, in this configuration, is similarly the material used to form the center layer portion). Such flooding occurs via material flow in the first and third flushing channels 330, 338 (through ports 301, 311, 304, 314). Moreover, allowing such flow will minimize pressure spikes and flow interruptions.
  ii. Flow of the material from the first extruder 20 in those flushing channels 330, 338 is similarly isolated from the material from the second extruder 30. That is, flow of the material from the second extruder 30 is connected only to the second flushing channel 334 (which dead heads at ports 313 and 316 against the side of the valve piston 66). Accordingly, the interior material (from the first extruder 20 entering inlet 96 in this configuration) will similarly not undesirably pollute the intended flow of surface material (flowing through isolated cross-over channel 212).
c. To the extent that any residual material flows (i.e., is not deadheaded) in flushing channels 330, 334, 338 after a change of configuration, the material flows toward the outlet 92 which is connected to the die inlet port 56 for the interior of the molded object (where any such mixture of materials is not critical).

Additionally, it should be appreciated that even during transitioning between the straight-through position (FIGS. 1 and 4) and cross-over positions (FIGS. 2 and 5) will not be blocked or "dead headed". That is, the spacing S between adjacent sides of the ports (i.e., on the body exit side 94, between port 301 and port 302, port 302 and port 303, port 303 and port 304, port 304 and port 305, port 305 and port 306, and on the entrance side 100 between port 311 and port 312, port 312 and port 313, port 313 and port 314, port 314 and port 315, and port 315 and 316) is less than the width (diameter D) of the through channels 200, 202 and inlet ports 96, 98 of the cross-over channels 210, 212.

Figure 6:
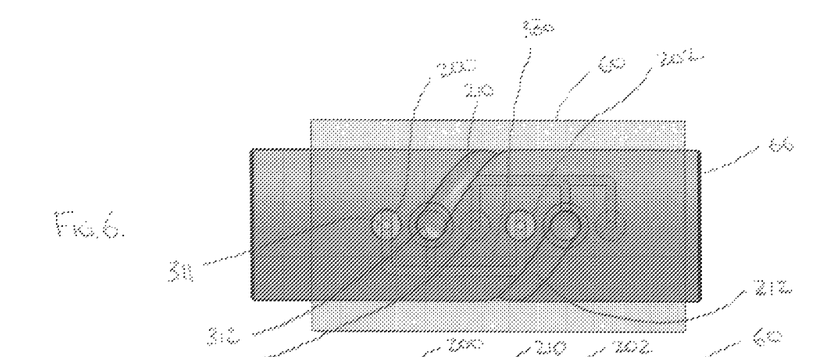
FIG. 6 is an entrance side view of the FIG. 3 diverter valve in the cross-over configuration of FIG. 5.
Figure 7:
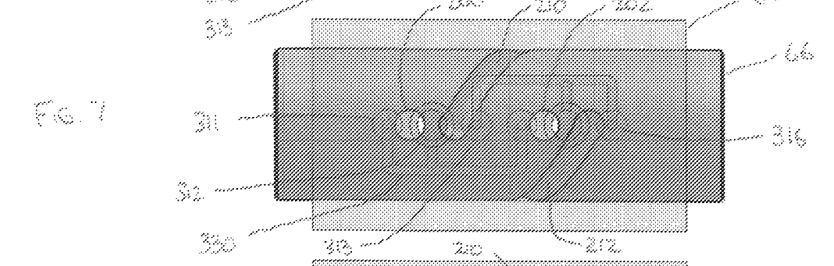
FIG. 7 is similar to FIG. 6, but showing the diverter valve in an intermediate transitional position between the cross-over configuration and the straight-through configuration.
Figure 8:
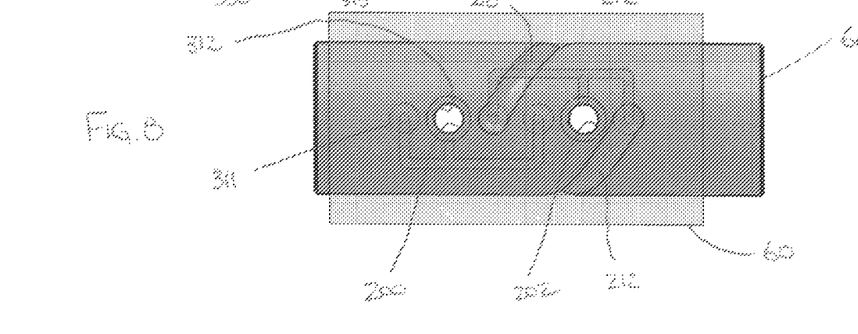
FIG. 8 is similar to FIGS. 5 and 6, but showing the diverter valve in the straight-through configuration.

Therefore, as illustrated in FIGS. 6-8, when the valve piston 66 is moved from the cross-over position (FIG. 6) to the straight-through position (FIG. 8) (by moving toward the right in FIGS. 6-8), before any of the through channels 200, 202 and cross-over channels 210, 212 are fully disengaged from the ports with which they were aligned in the cross-over position, they will begin opening to the ports with which they will be aligned when in the straight-through position as clearly illustrated in FIG. 7.

For example, during transitioning from the cross-over position (FIG. 6), the through channel 200 will shift from port 311 to port 312 and, during that transition, before the through channel 200 fully disengages from port 311 to terminate flow therein, the through channel 200 will begin connecting with port 312. Similarly, viewed from the perspective of a port, for example, port 312, when the valve 66 moves toward the straight-through position from the cross-over position, flow through port 312 gradually decreases as its connection with cross-over channel 210 reduces. However, before the cross-over channel 210 is completely disconnected from the port 312, the port 312 begins to be connected to the straight-through channel 200. Thus, at no point is flow through port 312 completely blocked.

This same transition occurs, of course, when moving from the straight-through position (FIG. 8) to the cross-over position (FIG. 6).

As a result, undesirable pressure spikes which can occur when a flow line is fully blocked can be virtually eliminated It should thus be appreciated that a diverter valve 50 incorporating the present invention may be used in molding applications in which the molded object has two discrete parts formed from two different materials. The present invention allows such operation to be accomplished while preventing problems in channels or passages which may not be used during a particular operation by keeping all of the channels or passages flush with extruded material. Moreover, where the purity of one of the materials is critical (e.g., where one of the materials is the visible portion of the molded object which must have a certain color and/or texture), the present invention allows switching the two materials in a manner which ensures that whichever of the materials is being used as the one critically requiring purity will, in fact, be pure without being polluted with the other material.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A diverter valve for controlling input of two different extruded materials to a mold for molding one of said materials covering the other of said materials, comprising:
a valve body having an axially extending opening therethrough;
a valve piston selectively axially movable in said body opening between a first position and a second position; wherein:
said valve body defines
a first inlet in one side adapted to received a first extruded material, and a second inlet in said one side adapted to receive a second extruded material, a first outlet in the side opposite of said one side, and a second outlet in the opposite side,
a first flushing channel communicating with said first inlet and including end ports open to said axial opening,
a second flushing channel communicating with said second inlet and including end ports opening to said axial opening, and
a third flushing channel communicating with said second outlet and including a plurality of ports opening to said axial opening,
said piston defines
first and second through channels extending between said one side and said opposite side,
a first cross-over channel having an inlet side port and an outlet side port, and
a second cross-over channel having an inlet side port and an outlet side port;
whereby
in said first position,
said first through channel connects said first inlet with said first outlet and said second through channel connects said second inlet with said second outlet,
said valve piston blocks said end ports of said first flushing channel, and
said first and second cross-over channels connect said second and third flushing channels to allow flow of material therein from the second inlet, and
in said second position,
said first cross-over channel connects said first inlet with said second outlet and said second cross-over channel connects said second inlet with said first outlet,
said valve piston blocks said end ports of said second flushing channel, and
said first and second through channels connect said first and third flushing channels to allow flow of material therein from the first inlet.

2. The diverter valve of claim 1, wherein flow of material from the flushing channels to the first outlet is blocked in both said first and second positions of said valve piston.

3. The diverter valve of claim 1, wherein said first and second inlets are axially spaced a distance X, and said first and second outlets are axially spaced the distance X, said first and second through channels are axially spaced the distance X, said inlet side port of said first cross-over channel and said inlet side port of said second cross-over channel are axially spaced the distance X, and said outlet side port of said first cross-over channel and said outlet side port of said second cross-over channel are axially spaced the distance X.

4. The diverter valve of claim 3, where said second cross-over channel inlet side port is axially aligned with said first cross-over channel outlet side port and said second cross-over channel outlet side port is axially aligned with said first cross-over channel inlet side port.

5. The diverter valve of claim 1, wherein
said first and second through channels have an axially extending width W;
said first and second cross-over channel ports have an axially extending width W; and
the axially adjacent ports are spaced at their nearest points a distance S;
wherein S<W.

6. The diverter valve of claim 5, wherein said first and second through channels are substantially cylindrical with a diameter W.

7. The diverter valve of claim 1, wherein said first outlet provides material to a die for covering material provided by the second outlet.

8. A diverter valve for controlling input of two different extruded materials to a mold for molding one of said materials covering the other of said materials, comprising:
   a valve body having an axially extending opening therethrough;
   a valve piston selectively axially movable in said body opening between a first position and a second position;
   wherein:
      said valve body defines
         a first inlet in one side adapted to received a first extruded material, and a second inlet in said one side adapted to receive a second extruded material, said first and second inlets being axially spaced a distance X,
         a first outlet in the side opposite of said one side, and a second outlet in the opposite side, said first and second outlets being axially spaced the distance X, and axially aligned with said first and second inlets, respectively,
         a first flushing channel communicating with said first inlet and including a first pair of ports at opposite ends open to said axial opening,
         a second flushing channel communicating with said second inlet and including a second pair of ports at opposite ends opening to said axial opening, and
         a third flushing channel communicating with said second outlet and including
            a third pair of ports at opposite ends opening to said axial opening, and
            first and second intermediate ports opening to said axial opening,
            wherein said third pair of ports and first and second intermediate ports are axially aligned with said first and second outlets; and
      said piston defines
         first and second through channels extending between said one side and said opposite side, said through channels being spaced apart axially by the distance X,
         a first cross-over channel having an inlet side port and an outlet side port, said inlet side port being axially spaced from the outlet side port by the distance X, and
         a second cross-over channel having an inlet side port and an outlet side port, said second cross-over channel inlet side port being axially aligned with said first cross-over channel outlet side port and said second cross-over channel outlet side port being axially aligned with said first cross-over channel inlet side port;
   whereby
      in said first position,
         said first through channel connects said first inlet with said first outlet and said second through channel connects said second inlet with said second outlet,
         said first cross-over channel connects one of said second pair of ports with one of said third pair of ports, and said second cross-over channel connects the other of said second pair of ports with said first intermediate port, and
         said first pair of ports, the other of said third pair of ports, and the second intermediate port are blocked by said piston,
      in said second position,
         said first through channel connects one of said first pair of ports with one of said third pair of ports, and said second through channel connects the other of said first pair of ports with the second intermediate port,
         said first cross-over channel connects said first inlet with said second outlet, and said second cross-over channel connects said second inlet with said first outlet,
         said other of the third pair of ports and the first intermediate port are blocked by said piston, and
         said second pair of ports, said one of said third pair of ports, and the first intermediate port are blocked by said piston.

9. The diverter valve of claim 8, wherein
   said first and second through channels have an axially extending width W;
   said first and second cross-over channel ports have an axially extending width W; and
   the axially adjacent ports are spaced at their nearest points a distance S;
   wherein S<W.

10. The diverter valve of claim 9, wherein said first and second through channels are substantially cylindrical with a diameter W.

11. The diverter valve of claim 8, wherein said first inlet is between said first pair of ports, said second inlet is between said second pair of ports, one port of said first pair of ports is between said second inlet and one port of said second pair of ports, and said one port of said second pair of ports is between said first inlet and said one port of said first pair of ports, wherein said inlets and said first and second pair of ports are oriented in an axially extending row and spaced from adjacent ports and inlets by a distance of X/3.

12. The diverter valve of claim 8, wherein said third flushing channel intermediate ports are between the first and second outlet, which are between the third pair of ports, said outlets and said third flushing channel ports being oriented in an axially extending row and spaced from adjacent ports and outlets by a distance of X/3.

13. The diverter valve of claim 12, wherein said first inlet is between said first pair of ports, said second inlet is between said second pair of ports, one port of said first pair of ports is between said second inlet and one port of said second pair of ports, and said one port of said second pair of ports is between said first inlet and said one port of said first pair of ports, wherein said inlets and said first and second pair of ports are oriented in an axially extending row and spaced from adjacent ports and inlets by a distance of X/3.

* * * * *